United States Patent [19]

Sokol

[11] Patent Number: 5,453,451
[45] Date of Patent: Sep. 26, 1995

[54] FINISHING COMPOSITION WHICH IS CURABLE BY UV LIGHT AND METHOD OF USING SAME

[76] Inventor: Andrew A. Sokol, 4909 Porter Rd., N. Olmsted, Ohio 44070

[21] Appl. No.: 38,518

[22] Filed: Mar. 29, 1993

Related U.S. Application Data

[63] Continuation of Ser. No. 701,442, May 15, 1991, abandoned.

[51] Int. Cl.[6] .......................................................... C08F 2/46
[52] U.S. Cl. ................................. 522/42; 522/75; 522/81; 522/103; 522/182; 427/519
[58] Field of Search ................................ 427/519; 522/42, 522/103, 75, 81, 182

[56] References Cited

U.S. PATENT DOCUMENTS 4,721,734   1/1988   Gehlhaus et al. .......................... 522/8

Primary Examiner—Mark A. Chapman
Attorney, Agent, or Firm—Weintraub, DuRoss & Brady

[57] ABSTRACT

A sprayable coating composition is formulated using one or more acrylates and one or more photoinitiators which act to polymerize the composition when exposed to ultraviolet light. Because of the use of low molecular weight monomers or oligomers, the composition is essentially free of volatile organic solvents and therefore evaporative emissions in curing are substantially eliminated.

8 Claims, No Drawings

FINISHING COMPOSITION WHICH IS CURABLE BY UV LIGHT AND METHOD OF USING SAME

This is a continuation of the application Ser. No. 701,442, filed May 15, 1991 now abandoned.

BACKGROUND OF THE INVENTION

1. Field of the Invention

The present invention relates to a substantially solvent-free coating composition which is curable by the application of ultraviolet light thereto, and a method of using the composition. More particularly, the present invention relates to such a coating composition which includes a polymerizable compound which includes at least one acrylate-containing compound and a photoinitiator which initiates a polymerization reaction in the composition when it is exposed to ultraviolet light.

Prior Art

Wood finishes are commonly used in many applications to treat the surface of wood for use in household items such as furniture, cabinets, decorative trim, etc. In addition, other coating compositions may be used to coat stone, glass, plastic, metals or other materials.

Normally, finishing compounds include either an organic solvent or else are water based. The organic solvents which are often used to thin coating compositions pose significant fire hazards, which makes Fire insurance difficult to obtain for companies in the business of finishing wood products. Another problem which is occasioned by the use of volatile organic solvents is that these solvents can create a real health hazard to employees who are chronically exposed to the fumes thereof. Renal problems as well as other health-related difficulties may ensue from long-term exposure of workers to these chemicals. With increasing consciousness about environmental and other hazards of the release of volatile components from many of these finishing compounds, a need now exists in the coating and finishing art for a coating composition which is substantially free of volatile components, in order to improve the environmental compatibility of such coatings. In addition, it would be advantageous if such a coating composition could be formulated which would be very quickly curable in order to maximize efficiency of production assembly processes.

Many coating compositions are known. A few examples of some previously known coating compositions follow.

Dickerhof U.S. Pat. No. 4,940,841 discloses an aqueous-based two-component paint system which includes a self-crosslinking amido-acrylate resin, melamine resin, urea resin, polyol, amine, and acid curing component.

Youji et al U.S. Pat. No. 4,170,671 discloses a method for the treatment of a metal surface by applying a treating liquid thereto which includes an acrylic polymer and a chromium compound. The composition of Youji et al is asserted to improve corrosion resistance of metal when applied thereto.

Eastland U.S. Pat. No. 2,829,067 discloses a wood finishing composition consisting of methylmethacrylate resin and borax. The composition of Eastland is applied as an aqueous emulsion.

Arney U.S. Pat. No. 4,212,928 discloses a spreadable putty for filling imperfections or defects in wooden articles, which is a composite including wood cellulose and a polymer which includes methylmethacrylate, ethylacrylate, methacrylic acid, and pentaerythritol triacrylate. Doebler U.S. Pat. No. 4,968,536 discloses a process for the production of a chip resistant coating finish which includes a carboxyl-containing polyester or methacrylate and a vinyl compound neutralized with a nitrogen base and also including an isocyanate prepolymer and auxiliary additives. The coatings of Doebler are aqueous based and are essentially free of volatile organic solvents, but require sufficient drying time to evaporate the water base.

An overview of some currently known technologies in coating compositions which are curable upon exposure to ultraviolet light may be found in the October, 1990 issue of Paint & Coatings Industry on pages 72–78. The focus of this article is primarily on polyester-based systems which require solvents as thinners.

An article about ultraviolet radiation-curable cellulose lacquers may be found on pages 38–46 of the November 1990 issue of Modern Paint and Coatings. However, the coatings discussed in this article required an 18 hour curing time at 25°–300° C. followed by four hours in a vacuum oven at 45° C.

Although many types of coating finishes are known, a need still exists in the art for an improved coating composition which is quick to cure For promoting efficiency of production processes. In addition, it would be advantageous if such a quick-curing coating composition did not contain volatile organic solvents, in order to minimize the health, safety, and environmental risks posed by such solvents.

SUMMARY OF THE INVENTION

The present invention provides an improved sprayable coating composition which cures very quickly upon exposure to ultraviolet light. The composition of the present invention is primarily made up of solids and is substantially free of solvents, and is therefore curable upon exposure to ultraviolet light without requiring evaporation of a solvent therefrom.

A coating composition in accordance with the present invention, generally, comprises:

from about 80 to about 99.5 percent by weight, based on the total weight of the composition, of a polymerizable compound which comprises an acrylate; and from about 0.5 to about 15 percent by weight, based on the total weight of the composition, of a photoinitiator which initiates a polymerization reaction in the composition when it is exposed to ultraviolet light.

The polymerizable compound may be selected from the group consisting of urethane-modified acrylates, polyester-modified acrylates, other substituted and unsubstituted monoacrylates, diacrylates, triacrylates, and mixtures thereof.

For a more complete understanding of the present invention, the reader is referred to the following detailed description section, which should be read in conjunction with the accompanying examples. Throughout the following description and in the examples, all parts are intended to be by weight, absent indications to the contrary.

DETAILED DESCRIPTION

The present invention provides a sprayable, substantially solvent-free coating composition which is especially useful for coating wood, metal or plastic articles, and which may be made up either as an opaque or a transparent coating composition. The composition thereof is especially advantageous as contrasted with the known coating compositions in that it does not generate any significant organic volatile evaporative emission component during the curing process and further, does not require the evaporation of any water-based solvent to complete the curing process. Rather, the curing is effected by a rapid polymerization reaction which is initiated by a photoinitiator component of the composition when it is exposed to ultraviolet light, and substantially the entire composition remains in place on the substrate during and after curing.

As noted, the coating composition of the present invention, generally, comprises:

from about 80 to about 99.5 percent, by weight, based on the total composition weight, of a polymerizable compound which comprises an acrylate; and from about 0.5 to about 15 percent, by weight, based on the total composition weight, of a photoinitiator which initiates a polymerization reaction in the composition when it is exposed to ultraviolet light.

More preferably, the composition hereof includes from about 90 to 99.5 percent of the polymerizable compound and from about 0.5 to about 8 percent of the photoinitiator.

In a preferred embodiment hereof, the coating composition hereof comprises 68 to 84 percent of a first diacrylate, 15 to 25 percent of a second diacrylate, and 1 to 8 percent of the photoinitiator.

The polymerizable compound may be selected from the group consisting of monoacrylates, diacrylates, triacrylates, urethane-modified acrylates, polyester-modified acrylates and mixtures thereof. The polymerizable compound, preferably, includes a mixture of acrylates. Suitable compounds which may be used in the practice of the present invention include but are not limited to, trimethylolpropane triacrylate, 1,6 hexane diol diacrylate, aliphatic urethane acrylates, vinyl acrylates, epoxy acrylates, ethoxylated bisphenol A diacrylates, trifunctional acrylic ester unsaturated cyclic diones, polyester diacrylates, and mixtures of the above compositions.

The photoinitiator which is used in the composition of the present invention may be of the free radical or cationic type. A combination of photoinitiators may be used. Photoinitiators which are suitable for use in the practice of the present invention include, but are not limited to, 1-phenyl-2-hydroxy-2-methyl-1-propanone, oligo{2 hydroxy-2 methyl-1-[4-(methylvinyl)phenyl]propanone}, 2 hydroxy 2-methyl 1-phenyl propan-1-one, 1-hydroxycyclohexyl phenyl ketone and benzophenone as well as mixtures thereof.

A preferred clear coat composition hereof comprises 65 to 85 percent ethoxylated bisphenol A diacrylate, 15 to 25 percent 1,6 hexanediol diacrylate, and 1 to 8 percent of a photoinitiator which is a mixture of oligo {2-hydroxy-2 methyl-1-[4(methylvinyl)phenyl] propanone} and 2-hydroxy-2methyl-1phenyl propan-1-one, sold commercially by Sartomer, Inc. under the mark ESACURE KP100F.

A preferred pigmented formula in accordance with the present invention comprises 60 to 80 percent ethyoxylated bisphenol A diacrylate, 15 to 25 percent 1,6-hexanediol diacrylate, 0.1 to 10 percent pigment solids, and 1 to 8 percent of a photoinitiator which is a mixture of oligo {2-hydroxy-2 methyl-1-[4(methylvinyl)phenyl] propanone} and 2-hydroxy-2methyl-1phenyl propan-1-one, sold commercially by Sartomer, Inc. under the Mark ESACURE KP100F.

The composition of the present invention may be cured by natural sunlight, by medium pressure mercury arc lights, or by long wave ultraviolet light depending on the photoinitiator package used.

The composition of the present invention is a significant improvement over the prior art coating compositions because of the fact that it does not contain any significant water or organic solvent which must be evaporated before curing is complete. Rather, the present invention includes low molecular weight polymerizable monomers and/or oligomers which are polymerized in place upon exposure to ultraviolet light. Therefore, the composition of the present invention is much less hazardous to the environment than the previously available compounds which included organic solvents which had to be evaporated into the atmosphere in order to cure the finish. To control pre-polymerization viscosity for sprayability, dipping or other means of application, a low molecular weight mono or di-acrylate is used, preferably, as one component of the present composition.

Possible methods of application include spraying, brushing, curtain coating, dipping, and rolling.

Because of the quickness of curing of the present composition, the formulation can be applied in repeated cycles. The composition of the present invention has the ability to be applied, cured, and sanded or burnished within the span of one minute and is then ready for repeated cycles. As such, five or ten coats can be applied in as many minutes.

The composition has the ability to control viscosity by the use of low molecular weight monomers which take the place of organic solvents but which also participate and contribute to final polymer properties. As viscosity can be controlled, the formulation can be used as a stain or sealant. When used on porous substrates such as wood, speed of wood penetration is a direct function of viscosity. Therefore, by controlling the viscosity of the material, depth and speed of penetration before curing can be controlled. On curing, the material polymerizes in and about the substrate providing adhesion thereto. The preferred viscosity of the composition hereof is from about 2 centipoise to about 300 centipoise at 25° C. and preferably from about 2 to about 200 centipoise at 25° C.

EXAMPLES

A series of coating compositions for use in coating wood were prepared, by mixing the ingredients together, in the order listed, at ambient temperature in the absence of ultraviolet light. The following table, Table I, lists the ingredients used in parts by weight, based on the total weight of the composition. These compositions were then sprayed onto a wood surface which was then exposed to ultraviolet light from a medium pressure mercury lamp with a spectral output in the range of 180–420 nanometers, inclusive, for 5 seconds to initiate the polymerization reaction. In each case, the composition polymerized in less than one minute, and no evaporation of any solvent was required to complete the curing of the composition.

TABLE I

| | FORMULAS | | | | |
|---|---|---|---|---|---|
| | 1 | 2 | 3 | 4 | 5 |
| Photoinitiator A[1] | 2.0 | | | | |
| Photoinitiator B[2] | | | 4.6 | | |
| Photoinitiator C[3] | | | | | 4.0 |
| Photoinitiator D[4] | | 4.3 | | | |
| Photoinitiator E[5] | | | | 2.0 | |
| Acrylate A[6] | 62.0 | | 7.5 | 62.0 | 32.0 |

TABLE I-continued

| | FORMULAS | | | | |
|---|---|---|---|---|---|
| | 1 | 2 | 3 | 4 | 5 |
| Acrylate B[7] | 31.0 | | | 31.0 | 64.0 |
| Acrylate C[8] | 5.0 | | 43.5 | | |
| Acrylate D[9] | | 75.4 | | | |
| Acrylate E[10] | | 20.3 | 44.2 | | |
| Acrylate F[11] | | | | 5.0 | |

[1] 1-phenyl-2-hydroxy-2-methyl-1propanone, sold commercially by Advanced Chemical division of EM Industries under the mark DAROCUR 1173.
[2] A combination of oligo {2-hydroxy-2-methyl-1-[4-(methylvinyl)phenyl]propanone} and 2-hydroxy-2-methyl 1-phenyl propan-1-one sold commercially by Sartomer, Inc. under the mark ESACURE KIP100 F.
[3] 1-hydroxycyclohexyl phenyl ketone sold commercially by CIBA-GEIGY Corp. under the mark Irgacure 184.
[4] 2-hydroxy-2-methyl-1-phenyl-propanon-1 sold commercially by Advanced Chemical division of EM Industries under the mark DAROCUR 4265.
[5] benzophenone
[6] trimethylolpropane triacrylate
[7] 1,6-hexanediol diacrylate
[8] aliphatic urethane acrylate
[9] ethoxylated bisphenol A diacrylate
[10] trifunctional acrylic ester unsaturated cyclic dione
[11] polyester diacrylate Although the present invention has been described herein with reference to preferred compositions thereof, the foregoing description and examples are intended to be illustrative, and not limitative. Many modifications of the present invention will occur to those skilled in the art. All such modifications which fall within the scope of the following claims is intended to be within the scope and spirit of the present invention.

Having, thus, described the invention, what is claimed is:

1. A sprayable, one-part, substantially solvent-free coating composition for applying to a substrate, consisting essentially of:

from about 80 to about 99.5 percent by weight, based on the total composition weight, of a polymerizable compound which comprises a mixture of acrylates, the acrylate mixture comprising a first acrylate and a second acrylate which has a lower molecular weight as compared to the first acrylate, the second acrylate being selected from the group consisting of monoacrylates, diacrylates and mixtures thereof, the second diacrylate being present in the composition in an amount effective to control pre-polymerization viscosity to a value in a range from about 2 centipoises to about 300 centipoises at 25 degrees C. to facilitate ease of application;

from about 1 to about 15 percent by weight, based on the total composition weight, of an organic photoinitiator which initiates a polymerization reaction in the composition when it is exposed to ultraviolet light; and wherein the composition is curable upon exposure to ultraviolet light without requiring evaporation of a volatile solvent therefrom.

2. The composition of claim 1, wherein the polymerizable compound is selected from the group consisting of monoacrylates, diacrylates, triacrylates, and mixtures thereof.

3. The composition of claim 2 wherein the polymerizable compound is selected from the group consisting of trimethyol propane triacrylate, 1,6-hexanediol diacrylate, aliephatic urethane acrylate, vinyl acrylate, epoxy acrylate, ethoxylated Bisphenol A diacrylate, trifunctional acrylic ester unsaturated cyclic diones, polyester diacrylates and mixtures thereof.

4. The composition of claim 1, wherein the photoinitiator is selected from the group consisting of 1-phenyl-2hydroxy-2-methyl-1-propanone, oligo{2 hydroxy-2 methyl-1-[4-(methylvinyl)phenyl]propanone}, 2 hydroxy 2-methyl 1-phenyl propan-1-one, 1-hydroxycyclohexyl phenyl ketone, benzophenones, thioxanthones, camphorphenones, cationic photoinitiators and mixtures thereof.

5. The composition of claim 1, further comprising 0.01 to 10% of a pigment or dye.

6. The composition of claim 1, wherein the composition comprises 68 to 84 percent of a first diacrylate, 15 to 25 percent of a second diacrylate and 1 to 8 percent of the photoinitiator.

7. The composition of claim 1, consisting essentially of:
   (a) from about 65 to about 85 percent, by weight, of the first acrylate;
   (b) from about 15 to 25 percent, by weight, of the second acrylate; and
   (c) from about 1 to 8 percent, by weight, of the photoinitiator.

8. A sprayable, substantially solvent-free coating composition for applying to a substrate consisting essentially of:

from about 80 to about 99.5 percent by weight, based on the total composition weight of a polymerizable compound which comprises a mixture of an aliphatic urethane acrylate, a polyester acrylate and a low molecular weight acrylate;

from about 0.5 to about 15 percent by weight, based on the total composition weight, of a photoinitiator which initiates a polymerization reaction in the composition when it is exposed to ultraviolet light; and wherein the composition is curable in less than one minute upon exposure to ultraviolet light without requiring evaporation of a volatile solvent therefrom, the composition being without an inorganic thickener and without a curing agent; and further wherein the low molecular weight acrylate is present in an amount effective to control pre-polymerization viscosity to a value in a range of from about 2 centipoises to about 300 centipoises at 25° C.

* * * * *